(12) United States Patent
Rolander et al.

(10) Patent No.: US 6,287,489 B1
(45) Date of Patent: Sep. 11, 2001

(54) METHOD FOR MAKING A SINTERED COMPOSITE BODY

(75) Inventors: Ulf Rolander, Stockholm; Gerold Weinl, Älvsjö, both of (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/520,878

(22) Filed: Apr. 5, 2000

(30) Foreign Application Priority Data

Apr. 7, 1999 (SE) .................................................. 9901221

(51) Int. Cl.$^7$ .................................................. C04B 33/32
(52) U.S. Cl. ............................................. 264/6; 264/642
(58) Field of Search ........................ 264/642, 6; 427/181, 427/190, 189

(56) References Cited

U.S. PATENT DOCUMENTS

| | | | |
|---|---|---|---|
| 4,866,885 | * 9/1989 | Dodsworth | 51/293 |
| 5,676,496 | 10/1997 | Littecke et al. | 407/118 |

FOREIGN PATENT DOCUMENTS

| | | |
|---|---|---|
| 19506692 | 2/1995 | (DE) . |
| 2252661 | 10/1990 | (JP) . |
| 4083759 | 3/1992 | (JP) . |
| 2039631 | 8/1993 | (RU) . |

OTHER PUBLICATIONS

Reed, Principles of Ceramics Processing Second Edition, Wiley & Sons. pp. 378–379,382–393,390, 1995.*

JP 1011950 A (Nippon Steel Corp) Jan. 17, 1989 (abstract) Word Patents Index (online). London, U.K.: Derwent Publications, Lt. (retrieved on May 29, 2000). Retrieved from EPO WPI Database. DW198908 Accession No. 189–058643; & JP 1011950 (Nippon Steel Corp) Apr. 27, 1989 (abstract)(online)(retrieved on May 29, 2000). Retrieved from: EPO PAJ Database; & JP 64–11950 (Nippon Steel Corp) Jan. 17, 1989, table1; and Abstract Only Translated.

JP 7138708 A (Sumitomo Metal Ind Ltd) May 30, 1995 (abstract) Word Patents Index (online). London, U.K.: Derwent Publications, Ltd. (retrieved on May 29, 2000). Retrieved from EPO WPI Database. DW199530 Accession No. 1995–229042; & JP 7138708 (Sumitomo Metal Ind Ltd) May 30, 1995 (abstract)(online)(retrieved on 2000–05–29). Retrieved from: EPO PAJ Database; & JP 7–138708 (Sumitomo Metal Ind Ltd) May 30, 1995. Abstract Only Translated.

S.J. Schneider et al., Engineered Materials Handbook, vol. 4., Ceramics and Glasses, 1991, ASM International, US XP002142646, pp. 141–146 "Dry Pressing".

Chemical Abstracts, vol. 122, No. 26, Jun. 26, 1995 (Jun. 26, 1995), Columbus, Ohio, US, J. Hori et al., "Manufacture of Ceramic Grains", XP002142647 & JP 07 082035 A (Kyocera Corp.) Mar. 28, 1995, (Mar. 25, 1995) Abstract Only.

* cited by examiner

Primary Examiner—Christopher A. Fiorilla
(74) Attorney, Agent, or Firm—Burns, Doane, Swecker & Mathis, L.L.P.

(57) ABSTRACT

A method of making a PcBN cutting tool insert is provided. The composite body may be a PcBN cutting tool insert. The method includes mixing raw material powders consisting of cBN and one or more of hBN, TiC, TiN, Ti(C,N), WC, W, C, Co, $Co_2Al_9$, Al AlN, $Al_2O_3$ with a liquid (e.g., ethanol) and an agent (e.g., polyethylene glycol, PEG) to form a homogeneous slurry with the desired composition; forming spherical powder agglomerates, typically 100 μm in diameter, preferably by spray drying; filling the PcBN powder into recesses, pockets, grooves, etc., of a cemented carbide or cermet substrate; presintering the compacted body to remove the agent; and causing the PcBN powder to be sintered together and simultaneously bonded to the substrate inside a container under HP/HT-conditions to form a composite body.

10 Claims, No Drawings

METHOD FOR MAKING A SINTERED COMPOSITE BODY

BACKGROUND OF THE INVENTION

The present invention relates to a cubic boron nitride powder suitable for the subsequent production of cutting tools and a method for its production.

Cutting tools having cutting edges formed of a super hard abrasive such as a cubic boron nitride (cBN)-based material are manufactured by powder metallurgical techniques and are mainly used for the machining of cast iron and hardened steel. For cast iron, a tough material with 80–100 wt % cBN is used, while for hardened steel 10–50 wt % of TiC, TiN or Ti(C,N) is usually added. This addition decreases toughness, but greatly improves the chemical stability of the material. Most often, the PcBN (polycrystalline cubic Boron Nitride) material also contains smaller amounts (typically <10 wt % each with a total maximum content of all such materials being 25 wt %) of other components, e.g., Co, Ni, WC, Al, AlN and $Al_2O_3$. These are either added to the raw material powder or obtained during processing.

PcBN cutting tools are mainly produced in two different ways:

i) By high pressure/high temperature (HP/HT) sintering of a PcBN powder mixture into a solid body that is cut and ground into a finished cutting tool insert; or ii) By HP/HT-sintering a thin layer of PcBN powder which simultaneously bonds to a substrate (usually a cemented carbide disc), from which smaller pieces (chips) are cut out. These chips are brazed onto a regular carbide tool (e.g., insert, end-mill, drill) and ground to the finished state. The tools are relatively expensive to produce due to the many steps the product must undergo before it is finished. Also, usually only one or two cutting edges per tool are available.

Through U.S. Pat. No. 5,676,496, a technique is known for producing PcBN cutting tool inserts in a more cost efficient way. This is achieved by placing a cemented carbide or cermet substrate into a container and then packing PcBN powder into appropriately placed grooves in a substrate. The container is then HP/HT-sintered so that the PcBN powder is consolidated to a fully dense body, which is simultaneously bonded to the substrate. The substrate/PcBN compound may then directly be ground to a cutting tool insert.

Although the method described leads to extensive cost reductions per cutting edge, it has one major drawback in that the packing of a powder mixture containing PcBN into the grooves in principle must be done manually. The poor flow properties of PcBN powder in combination with the required groove geometry make automatic processing unreliable. Apart from obvious health hazards, manual packing may lead to uneven packing density and to excessive oxygen exposure of the PcBN powder. Uneven packing density makes it necessary to choose a larger groove dimension than desired to ensure that the amount of PcBN obtained is always sufficient. Careful control of the oxygen content in the PcBN powder is critical for the HP/HT sintering since excessive oxygen negatively affects the consolidation process. In principle, one would like to have a high and highly reproducible packing density and to minimize the oxygen pickup during handling and storage.

OBJECTS AND SUMMARY OF THE INVENTION

It is an object of this invention to avoid or alleviate the problems of the prior art.

It is further an object of this invention to provide a cubic boron nitride powder suitable for subsequent production of cutting tools and a method for its production.

It is one aspect of the invention to provide a method of making a PcBN cutting tool insert comprising:

mixing PcBN or diamond with a liquid and an agent to form a homogenous slurry of a desired composition;

forming spherical powder agglomerates of said mixture;

filling the said agglomerates into recesses of a cemented carbide or cermet substrate;

removing the agent from the said agglomerates at a suitable temperature and atmosphere; and sintering and simultaneously bonding the agglomerates to the substrate in a container under HP/HT-conditions to form a composite body.

In another aspect of the invention, there is provided spherical powder agglomerates comprising PcBN 50 to 200 $\mu$m in diameter.

DETAILED DESCRIPTION OF THE PREFERRED EMBODIMENTS OF THE INVENTION

According to the presently claimed invention, there is provided a PcBN-containing powder with good flow properties. The powder is particularly suitable to make bodies in complicated shapes with tight tolerances and high reproducible green body density.

According to the method of the presently claimed invention, the making of a powder suitable for producing the material described above, comprises the following steps:

1. Mixing raw material powders, i.e., cBN and one or more of, e.g., hBN (hexagonal Boron Nitride), TiC, TiN, Ti(C,N), WC, W, C, Co, $Co_2Al_9$, Al AlN, $Al_2O_3$ in conventional amounts as discussed above (that is, up to 50 wt % of Ti, C, TiN, and/or Ti(C,N) and up to 25 wt % of the total of the others), with a suitable liquid (e.g., ethanol) and an agent (e.g., polyethylene glycol, PEG) to form a homogeneous slurry with the desired composition. The agent acts to form the agglomerates as a binder. The liquid should be a solvent for the agent and should be removable at temperatures up to about 400° C. Various combinations of liquid/agent are determinable by those of ordinary skill in the art.

2. Forming spherical powder agglomerates, typically from 50 to 200 $\mu$m, usually about 100 $\mu$m in diameter, with good flow properties using the spray drying technique.

3. Filling the PcBN powder into recesses, pockets, grooves, etc., of a cemented carbide or cermet substrate.

4. Removing the agent from the powder at a suitable temperature and atmosphere less than the sintering temperature (preferably 200°–400° C. in flowing hydrogen for PEG).

5. Causing the PcBN powder to be sintered together and simultaneously bonded to the substrate inside a container under HP/HT-conditions to form a composite body, e.g., a cutting tool insert.

The method has been described with references to PcBN but it is obvious that it can be used also using diamond as the abrasive material or mixtures thereof.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of making a composite body comprising:

mixing PcBN or diamond with a liquid and an agent to form a homogenous slurry of a desired composition;

forming spherical powder agglomerates of said slurry;

filling the said agglomerates into recesses of a cemented carbide or cermet substrate;

removing the agent from the said agglomerates at a suitable temperature and atmosphere; and sintering and simultaneously bonding the agglomerates to the substrate in a container under HP/HT-conditions to form a composite body.

2. The method of claim 1 wherein said PcBN or diamond powder is mixed with another powder prior to sintering to form a composition, said another powder taken from the group consisting of hBN, TiC, TiN, Ti(C,N), WC, W, C, Co, Ni, $Co_2Al_9$, Al, AlN, $Al_2O_3$ and mixtures thereof.

3. The method of claim 2 wherein the said another powder is TiC, TiN and/or Ti(C,N) present in amounts of from about 10 to 50 wt % of the composition.

4. The method of claim 2 wherein the said another powder is Co, Ni, $Co_2Al_9$, Al, AlN and/or $Al_2O_3$ present in amounts of up to 10 wt % of the composition.

5. The method of claim 1 wherein the spherical powder agglomerates have a diameter of from 50 to 200 $\mu$m.

6. The method of claim 5 wherein the spherical powder agglomerates are about 100 $\mu$m in diameter.

7. The method of claim 1 wherein the agent is a polyethylene glycol.

8. The method of claim 1 wherein the agent is removed by heating the agglomerates to a temperature of from about 200° to 400° C.

9. The method of claim 1 wherein the agent is removed by heating in a hydrogen atmosphere.

10. The method of claim 1, wherein the composite body is a cutting tool insert.

* * * * *